(12) United States Patent
Narumi

(10) Patent No.: US 7,500,839 B2
(45) Date of Patent: Mar. 10, 2009

(54) FOAM MOLDING APPARATUS

(75) Inventor: Kaoru Narumi, Nishio (JP)

(73) Assignee: K. K. Kyokutoseiki, Nagoya (JP)

( * ) Notice: Subject to any disclaimer, the term of this patent is extended or adjusted under 35 U.S.C. 154(b) by 0 days.

(21) Appl. No.: 10/592,418

(22) PCT Filed: Jan. 17, 2005

(86) PCT No.: PCT/JP2005/000464

§ 371 (c)(1),
(2), (4) Date: Sep. 11, 2006

(87) PCT Pub. No.: WO2005/090044

PCT Pub. Date: Sep. 29, 2005

(65) Prior Publication Data

US 2007/0190193 A1    Aug. 16, 2007

(30) Foreign Application Priority Data

Mar. 17, 2004    (JP) .............................. 2004-076843

(51) Int. Cl.
*B29C 44/02* (2006.01)

(52) U.S. Cl. .................. 425/4 R; 425/127; 425/546; 425/812; 425/817 R

(58) Field of Classification Search .............. 425/4 R, 425/127, 546, 812, 817 R; *B29C 44/02*
See application file for complete search history.

(56) References Cited

U.S. PATENT DOCUMENTS

| | | | | | |
|---|---|---|---|---|---|
| 3,970,732 | A | * | 7/1976 | Slaats et al. ................ | 264/40.5 |
| 4,555,087 | A | * | 11/1985 | Wallner et al. ................ | 249/78 |
| 5,173,307 | A | * | 12/1992 | Nestle ......................... | 425/4 R |
| 5,965,169 | A | * | 10/1999 | Hirata et al. ................ | 425/4 R |
| 6,361,723 | B1 | * | 3/2002 | Sulzbach et al. .............. | 264/51 |
| 6,558,592 | B1 | * | 5/2003 | Nohara et al. ................. | 264/51 |
| 2003/0020196 | A1 | * | 1/2003 | Mayakawa et al. ......... | 264/46.4 |
| 2005/0230864 | A1 | * | 10/2005 | Ozasa et al. ................ | 264/102 |

FOREIGN PATENT DOCUMENTS

| | | | |
|---|---|---|---|
| JP | 57057921 | | 9/1980 |
| JP | 02111507 | | 9/1990 |
| JP | 03015112 | | 2/1991 |
| JP | 04029812 | | 1/1992 |
| JP | 06047754 | | 2/1994 |
| JP | 2003145557 | | 5/2003 |
| JP | 2003285339 | | 10/2003 |
| JP | 2005-81575 | * | 3/2005 |
| JP | 2005081575 | | 3/2005 |

* cited by examiner

*Primary Examiner*—Yogendra Gupta
*Assistant Examiner*—Maria Veronica D Ewald
(74) *Attorney, Agent, or Firm*—Michael Tobias

(57) ABSTRACT

A mold for molding is provided from which gas release can easily take place at the time of molding a foam body, which can minimize the amount of formation of burrs, and which can be easily processed. It is a mold for foam molding comprising a mold body comprising an upper mold half and a lower mold half, upper and lower outer peripheral portions provided on the peripheral portions of the upper and lower mold halves, and sealing surfaces provided on the contact surfaces of the upper and lower outer peripheral portions. A plurality of grooves are provided so as to surround the mold body on at least one of the sealing surfaces provided in the outer peripheral portions of the upper mold half and the lower mold half, and a tube for storing gas is embedded in the outermost groove of the plurality of grooves.

17 Claims, 4 Drawing Sheets

(a)

(b)

FOAM MOLDING APPARATUS

TECHNICAL FIELD

This invention relates to a foam molding apparatus and particularly to a foam molding apparatus for use in molding an expanded foam of a urethane resin or the like.

BACKGROUND ART

FIG. 1 is a schematic cross-sectional view of one type of conventional foam molding apparatus, and FIG. 2 is an enlarged schematic cross-sectional view of a portion thereof showing the state when upper and lower halves of a mold for foam molding (which may be referred to below as a "mold") are closed.

As shown in FIG. 1, a seal portion 14 is provided in the PL portion 12 (the parting line of the product) in the boundary region of upper and lower halves 10a and 10b of a mold body 10 so as to prevent an expanded foam from leaking out from the mold during the foam molding of a urethane resin, for example. In addition, gas which is formed during molding is discharged to the exterior of the mold by minute grooves or holes 16 separately and suitably provided in the wall surface of the upper half of the mold. The seal portion 14 is formed by providing a resin layer on one or both of the wall surfaces of the upper and lower halves of the mold in the upper and lower outer peripheral portions 17, 17 which are peripheral rim portions of the upper and lower halves 10a and 10b. In the figure, the upper half 10a can be closed as shown by dashed lines. The hollow arrow shows the direction of opening and closing.

The conventional minute grooves or holes 16, however, are sometimes easily plugged up at the time of foam molding. In such cases, the pressure inside the mold body increases, and suitable foam molding can not be carried out.

Namely, as shown in the enlarged view of FIG. 2, the seal portion 14 constitutes the PL portion 12 of the foam molding mold 10. If a sudden rise in internal pressure occurs due to the generation of gas accompanying foam molding like that described above, or if the sealing ability of the opposing surfaces of both outer peripheral portions of the upper and lower halves of the mold is inadequate, sudden escape of gas (referred to below as gas release) from the seal portion 14 occurs, and foaming does not take place uniformly. In particular, in the region 26 shown by a hollow circle in the figure, a portion of the molded body is locally hardened (this is referred to as local hardening), and a large number of burrs form along the entire periphery of the mold in the PL portion 12.

Such burrs are ultimately removed in a process referred to as trimming, but the formation of a large number of burrs leads to an increase in costs. Furthermore, in portions of the PL surface where burrs are formed, since the foam density decreases due to protrusion of urethane foam, bubbles become too large, and the hardness decreases below a target value. In addition, even after trimming, the above-described hardened portions remain as a hard layer, and when the molded product is formed into an automobile seat or the like, for example, there are problems such as the product being unpleasant to the touch.

In the past, there have been many attempts at solving such problems. For example, it has been attempted to increase the ability to form a seal between an upper and lower half of a mold. For this purpose, a groove was provided in the outer peripheral portion of the upper half around the entire periphery so as to surround the mold body and to embed a tube of a synthetic resin as a sealing member therein. The tube can function as a type of packing, and a certain degree of sealing effect was obtained. However, in this case, since a complete seal mechanism is now formed, gas collects inside the product, the collected gas forms voids, and the internal pressure increases. Under this high pressure, the sealing properties become inadequate even with the above-described sealing mechanism, and far from burrs being eliminated from a product, the formation of burrs is promoted.

DISCLOSURE OF THE INVENTION

Problem to be Solved by the Invention

The problem to be solved by the present invention is to provide a foam molding apparatus which can effectively prevent gas release at the time of foam molding, which can minimize the formation of burrs, and which can be easily manufactured.

Means for Solving the Problem

The present inventors performed various investigations in order to solve such a problem, and they conceived of providing a gas storing groove on the periphery of a mold body. The groove works to receive gas which is generated during foam molding and to equalize the pressure on the inside and outside of the mold, whereby the release of gas from the PL portion in the mold periphery at the time of foam molding and the formation of burrs are eliminated.

The present invention is a foam molding apparatus having a mold body comprising an upper half and a lower half of the mold body, an upper outer peripheral portion and a lower outer peripheral portion which are provided on the peripheral rim portions of the upper and lower halves of the mold and oppose each other, and seal portions which are provided on the opposing surfaces of the upper and lower outer peripheral portions and form a seal between the interior and exterior of the mold, characterized in that a gas storing groove portion which captures and stores gas which is generated during foam molding and imparts a gas pressure which is substantially equal to the pressure of the interior of the mold body is provided on at least one of the opposing surfaces of the upper and lower outer peripheral portions of the upper half and the lower half of the mold, and in that the gas storing groove portion surrounds at least a portion of the mold body.

In a preferred embodiment of the present invention, at least one gas discharge groove which has one end which opens towards the interior of the mold body and another end which connects with the gas storing groove portion is provided on at least one of the opposing surfaces of the upper and lower outer peripheral portions.

In the present invention, the pressure within the gas storing groove portion can balance the pressure within the mold by capturing from the gas discharge groove the gas which is generated at the time of foam molding and storing it, but more preferably, a pressure adjusting mechanism for the pressure inside the gas storing groove portion is further provided. There is no particular restriction on the pressure adjusting mechanism. For example, it may comprise a pressure adjusting valve installed on a pipe communicating with the gas storing groove portion or a pressure adjusting mechanism having an accumulator.

EFFECTS OF THE INVENTION

According to the present invention, a foam molding apparatus and particularly a foam molding apparatus for use in foam molding of urethane resins is provided which can effectively prevent gas release from the PL portion at the time of foam molding, which can minimize the formation of burrs, and which can be easily manufactured. The practical significance of the present invention is great also in light of its excellent economy.

BEST MODE FOR CARRYING OUT THE INVENTION

The present invention will be explained in conjunction with the attached drawings.

FIG. 3(a) is a schematic cross-sectional view of a foam molding apparatus according to the present invention. FIG. 3(b) is an enlarged view of a portion thereof. FIG. 4 is a schematic plan view as seen from the interior of the upper half of a rectangular mold. FIG. 4 shows a preferred mold and schematically explains the arrangement of a gas storing groove portion, i.e., a gas chamber for capturing and storing gas which is generated during foam molding, a gas discharge groove, and a sealing groove. For convenience, each of the above-described grooves is illustrated with cross-hatching.

Figure 1:
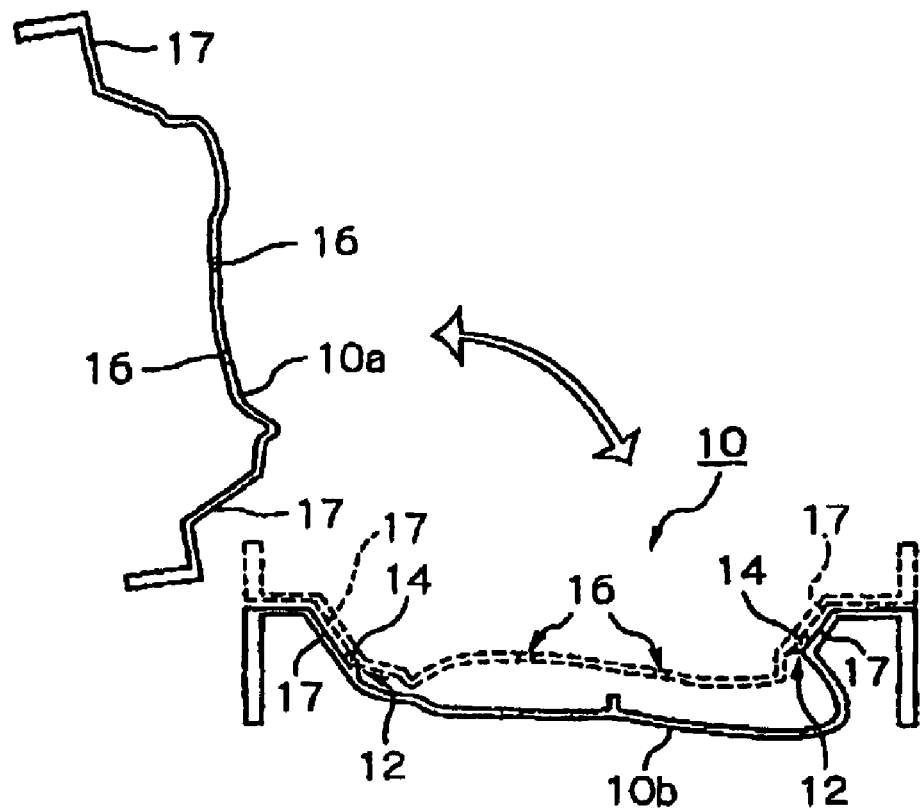
FIG. 1 is a schematic cross-sectional view of a mold for molding in the prior art.
Figure 2:
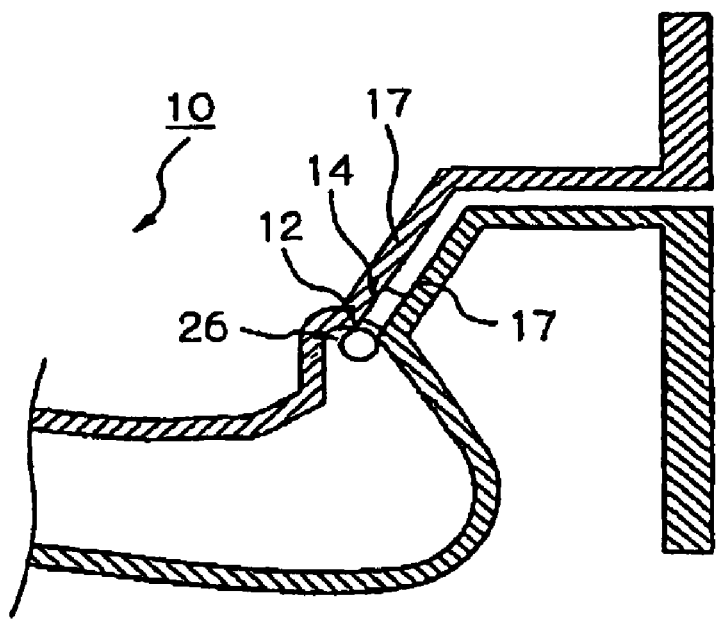
FIG. 2 is an enlarged cross-sectional view of a portion of the mold of FIG. 1 in a closed state.
Figure 3:
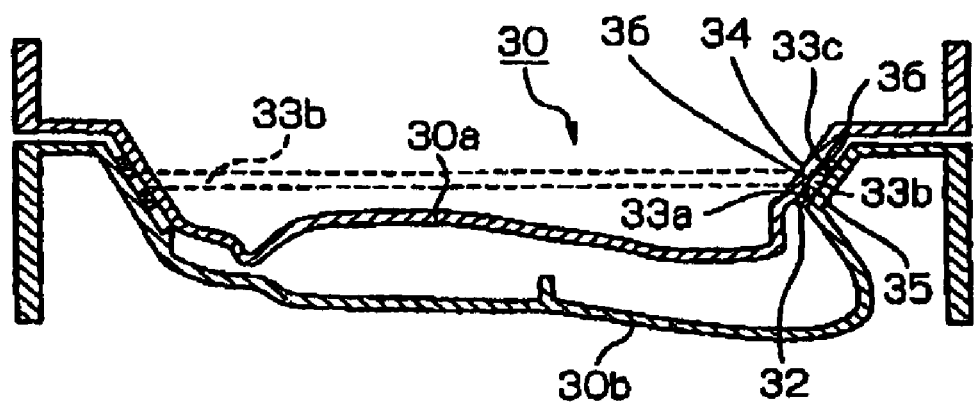
FIG. 3(a) is a schematic cross-sectional view of a mold for foam molding used in the present invention.
FIG. 3(b) is an enlarged cross-sectional view of a portion thereof.
Figure 3:
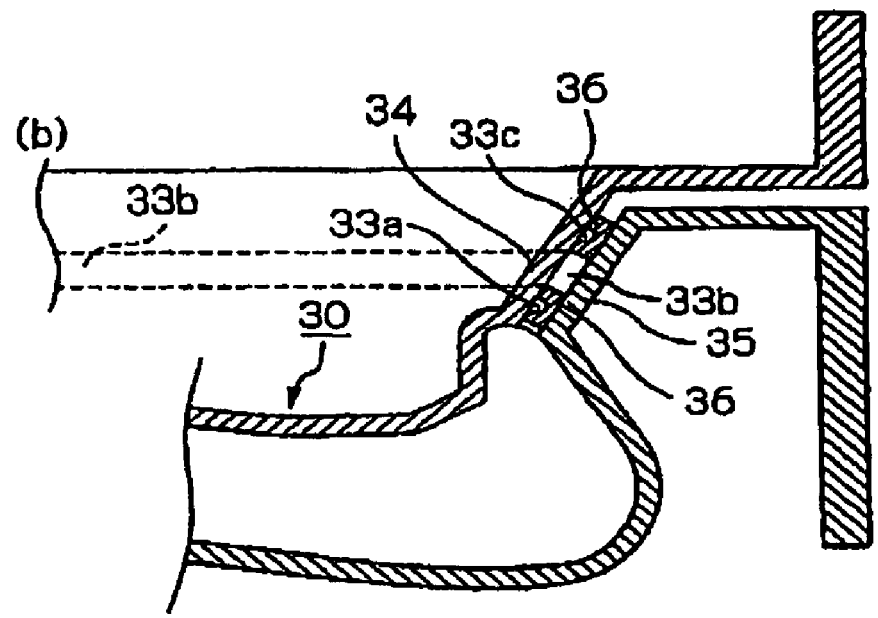
Figure 4:
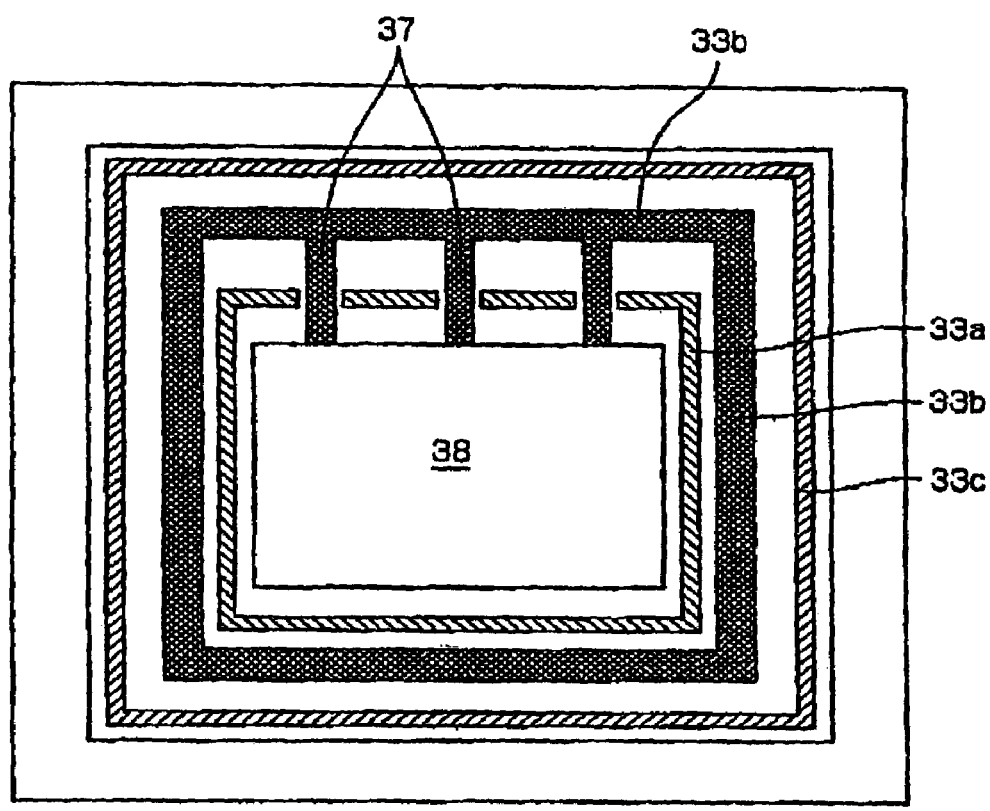
FIG. 4 is a schematic plan view seen from the interior of the upper mold half of a foam molding apparatus according to the present invention.

As shown in FIG. 3 and FIG. 4, an upper half 30a and a lower half 30b are combined to constitute a mold body 30 for foam molding. According to the present invention, the foam molding apparatus includes a PL portion 32 which is constituted by an upper outer peripheral portion 34 and a lower outer peripheral portion 35 provided on the peripheral rims of the upper and lower halves of the mold, and a seal portion 36 which is formed on the opposing surfaces of the upper and lower outer peripheral portions 34 and 35. A seal is formed between the interior and exterior of the mold by the seal portion 36.

According to the present invention, a gas storing groove portion 33b which can capture and collect a foaming gas generated during foam molding is provided on at least one of the opposing surfaces of the upper and lower peripheral portions 34 and 35. As shown by dashed lines in the example shown in FIG. 3, the gas storing groove portion 33b is constituted by a corridor-like groove portion which surrounds at least a portion of the periphery of the mold like a corridor. In the state shown in FIG. 4, the corridor-like groove portion is provided so as to surround the mold on four sides.

The function of the gas chamber 33b is to capture and store a foaming gas which is generated during foam molding. The pressure within the gas chamber 33b, therefore, gradually increases to a pressure which is nearly equal to the pressure inside the mold body and can balance the pressure between the interior and exterior, with the PL portion as a boundary. Even if gas is generated in large quantities in the initial stage of foam molding and leaks from the PL portion, for example, gas blow-off, i.e., a sudden gas release does not take place since the gas pressure inside the gas chamber can be equal to that within the mold. In this manner, up to the final stage of molding, by equalizing the pressures on the interior and exterior of the mold around the entire mold, flow of material accompanying a gas release is not observed, and an attractive foam molded body having a uniform surface condition is obtained.

This gas storing groove portion is provided for the purpose of equalizing the pressures on the interior and exterior of the mold at the time of foam molding, and it thereby prevents gas release and the formation of burrs at the time of foam molding. It is sufficient to provide the gas storing groove at least in those locations where it is necessary to exhibit this effect. It is not always necessary to provide a seal portion on the inner side of the gas storing groove portion in the outer peripheral portion of the mold. Even when a seal portion is provided, it is not necessary for the sealing portion to have a particularly high sealing ability. Rather, it is preferable for the sealing ability to be of a level to allow gas release in the initial stage of foam molding.

As already stated, a large amount of gas is generated in the initial stage of foam molding. In the preferred mode of the present invention shown in FIG. 4, a plurality of gas discharge grooves 37 are provided in order to rapidly discharge this large amount of gas to outside the mold.

The gas chamber 33b is connected to at least one gas discharge groove 37 having one end opening onto the interior 38 of the mold body. The function of the gas discharge grooves 37 is to discharge a foaming gas generated during foam molding to outside the mold and to absorb overflow of foamed material in the final stage of molding. From the standpoint of gas discharge, it is necessary for its cross-sectional dimensions to be as small as possible. However, it is preferable that it not have a minute diameter like conventional gas discharge holes but that it instead have a shape and dimensions large enough to absorb overflow, as described above. Ultimately, this portion itself remains as a burr, but it can be easily removed by trimming. In some cases, this type of burr can be reduced to such a level that a trimming step is unnecessary.

In the illustrated embodiment, at least one groove (three grooves 33a, 33b, and 33c in the illustrated example) is provided on either one or both of the opposing surfaces of the upper and lower outer peripheral portions. In the illustrated example, the seal portion 36 is constituted by two resin layers with a space, i.e., a groove disposed therebetween. At least one of these grooves constitutes a gas chamber 33b for capturing and storing gas, i.e., a gas storing groove portion. The gas storing groove portion is constituted by a space between two resin layers.

By constituting the gas storing groove portion in this manner, it is unnecessary to perform press working or electro-discharge forming or machining of the mold itself, and manufacture of a foam molding apparatus becomes simple.

When a plurality of grooves are provided in the seal portion, at least one constitutes a groove for a sealing member in the form of a tube to form a seal between the interior and exterior of the mold. When a plurality of grooves for sealing are provided, it is not necessary for the groove on the inner side to surround all four sides, and it need not be provided on the side, i.e., in the region where the discharge grooves 37 are provided. The outermost sealing groove 33c is preferably provided so as to surround all four sides of the mold.

Figure 5:
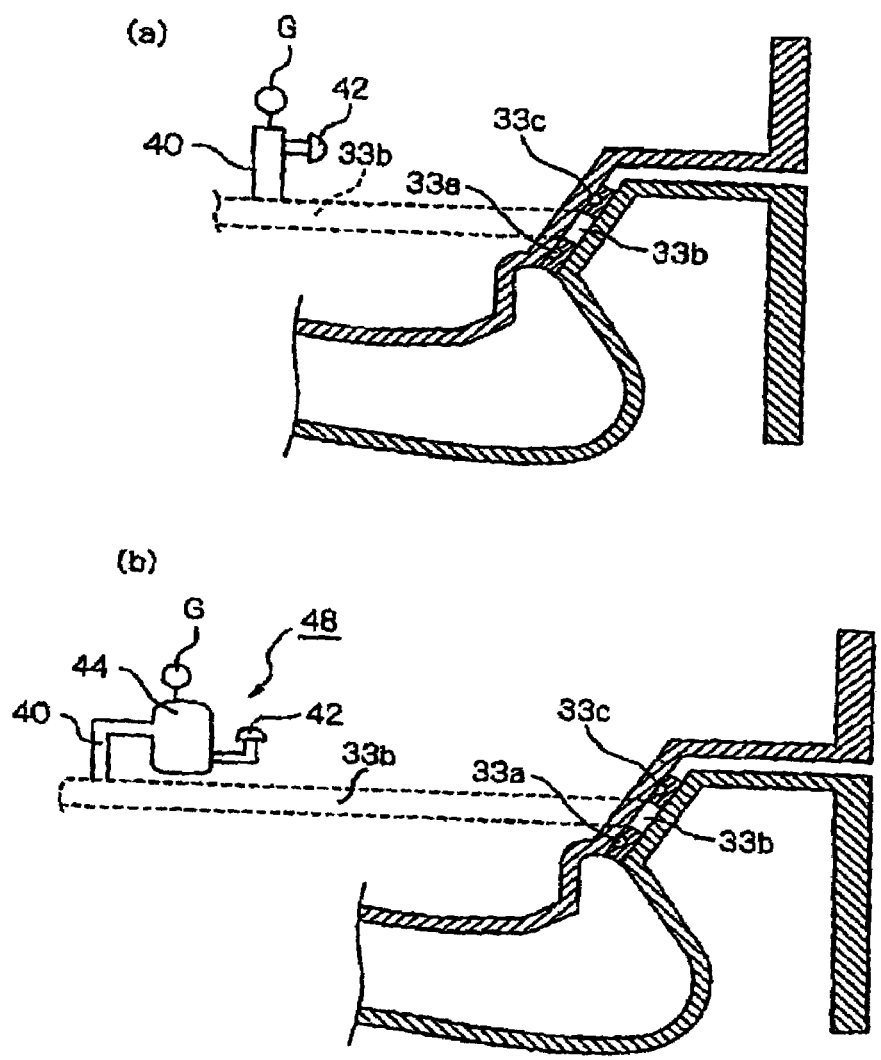
FIG. 5(a) is a schematic explanatory view of a foam molding apparatus according to the present invention having a pressure adjusting mechanism constituted by a pressure adjusting valve.
FIG. 5(b) is a schematic explanatory view of a foam molding apparatus according to the present invention having a pressure adjusting mechanism constituted by an accumulator and a pressure adjusting valve.

FIGS. 5(a) and 5(b) show further modifications of a foam molding apparatus according to the present invention. They show an example in which a pressure adjusting mechanism is provided in connection with the gas chamber 33b. FIG. 5(a) shows an example in which a relief valve 42 for pressure adjustment is provided on a pipe 40 communicating with a suitable portion of the gas chamber 33b. Symbol G indicates a pressure gauge. In the case of FIG. 5(b), a pressure adjusting mechanism is provided which comprises an accumulator 44, a pressure gauge G, and a relief valve 42 for pressure adjustment. The accumulator 44 is connected through a pipe 40 with a suitable location of the gas chamber 33b.

According to the example shown in FIG. 5(b), the gas chamber 33b is connected with a gas pressure adjusting mechanism, and the gas pressure within the chamber can be adjusted with a precision of ±0.002 MPa, for example, by a precision regulator 48 comprising an accumulator 44 which communicates through pipe 40, for example, with the gas chamber 33b in a suitable location. While observing the state of occurrence of burrs at the time of foam molding, the gas pressure within the gas chamber 33b is adjusted with such a precision gas pressure control mechanism to balance the gas pressure within the mold and the gas pressure within the gas chamber 33b, and the formation of so-called burrs can be effectively prevented. Of course, the gas pressure also becomes uniform within the mold and the formation of so-called hard portions and the like can also be prevented.

In the final stage of molding, overflow of material occurs, but this takes place through the above-described gas discharge grooves 37, and outflow from other locations, i.e., the formation of burrs is minimized.

In general, a mold is made of a metal such as an aluminum alloy or a resin such as an epoxy or polyester. In the case when it is made of an alloy, each of the above-described grooves can be formed by machining or the like at the time of mold manufacture. Alternatively, a resin layer may be provided on one or both of the upper and lower outer peripheral portions 34 and 35 and the entire seal portion 36 may be constituted by a resin layer, and each of the above-described grooves may be formed in advance in this resin layer.

Of course, when the mold is made of a resin, the grooves can be formed in advance at the time of laminating and casting of the mold. In either case, a groove can be formed on one or both of the upper and lower outer peripheral portions. Providing a resin layer on the opposing surfaces of the upper and lower outer peripheral portions makes manufacture easy and improves sealing properties. An example of a resin layer at this time is an epoxy resin.

According to a further improvement of the present invention, a groove portion of a desired shape can be formed by spacing the opposing surfaces of the upper and lower outer peripheral portions of the mold from each other and partitioning the space between them with resin layers to provide a groove between the resin layers. In this case, the opposing surfaces of the outer peripheral portions of the mold are not machined in any way, and resin layers can be simply placed thereon in prescribed regions.

A sealing depression may be formed in a seal portion by preparing a plate-shaped material which has been worked to give it the shape of the sealing depression such as a rectangular cross section, placing the plate-shaped material on the outer peripheral portion of the upper half of the mold, providing a resin (epoxy) layer on the outer peripheral portion of the lower half of the mold, pressing them against each other, and after the resin hardens, removing the plate-shaped material having the shape of the sealing depression. A parting compound may be previously applied to the plate-shaped member.

The above-described resin layers are used as partitions of the space between the upper and lower halves of the mold to form a gas chamber groove portion. This layer may also be used as the resin layer to form the sealing depression.

It is difficult to form a sealing depression in an area around the gas discharge grooves 37 in the manner described above, and the gas discharge grooves 37 are preferably machined in advance in the mold itself.

By using such a method, the time required to form the groove portion and the seal portion can be greatly shortened, the cost of manufacturing the mold can be lowered, and economical foam molding becomes possible.

In addition to the above-described elements, a foam molding apparatus according to the present invention includes a suitable clamping means for the upper and lower halves of the mold, a resin injecting means, a heating means, and the like, but these may be conventional ones. There are no particular restrictions thereon in the present invention, and an explanation thereof will be omitted.

The operation of a foam molding apparatus according to the present invention will be described more specifically taking foam molding of a urethane resin as an example.

First, a urethane resin is introduced into the lower half of the mold, and the upper half is clamped thereto as a cover. After heating for roughly 20-30 seconds, the resin expands in the form of a foam. Due to the reaction gas which is formed at that time, the urethane resin forms a foam, its volume expands, and it is molded to the shape of the inside of the mold. The gas which exerts a drive force for foaming at this time is discharged. Grooves 37 for gas discharge are provided in the mold, and they are connected with groove 33b which forms a gas chamber. When a pressure control mechanism exemplified by a pressure regulator is connected to the gas chamber, the pressure within the gas chamber can be adjusted with high precision.

According to the present invention, when the gas generated in the foamed product passes through the gas discharge grooves 37 and flows into the gas chamber groove 33b, the pressure within the chamber then increases, and the gas pressures inside and outside the mold are balanced. Since the reaction is completed while excess pressure is not discharged, i.e., while abrupt gas release is prevented, a target level of density of the urethane can be achieved extremely easily.

Furthermore, according to the present invention, the gas chamber 33b is provided in at least a portion of the periphery surrounding the mold and communicates with the gas discharge grooves 37. The gas chamber 33b functions as a pressure vessel, and if necessary, the gas pressure within the gas chamber can be adjusted with high precision. Therefore, there is substantially no pressure difference between the interior and exterior of the mold in the seal portion of the PL portion, and urethane and gas are concentrated in the gas discharge grooves 37. Since gas therefore does not collect in the remaining regions, molding can be cleanly carried out, and it becomes difficult for burrs to form even in the final stage of molding.

In a modification of the present invention, by surrounding at least a portion of the mold body like a corridor, the locations where burrs are formed in the PL portion can be minimized.

In another variation of the present invention, if a sealing groove is provided on the inner side of a gas storing groove portion in the outer peripheral portion of a mold and a tube is disposed therein to increase the sealing effect, the formation of burrs can be even more effectively suppressed.

According to the present invention, therefore, there are no hard portions (portions where the density of urethane becomes high and which are hard and feel incompatible) which are formed in the region of gas release with a conventional PL portion. A suitable uniform density can be maintained over the entire product, and there are no burrs. In addition, this shape can be formed in a short period of time.

EXAMPLES

In this example, three grooves were formed on the periphery of a mold body as shown in FIG. 3, FIG. 4, and FIG. 5(b). However, an inner sealing groove 33a was not provided on the side where gas discharge grooves were provided in FIG. 4.

The grooves 33a, 33b, and 33c in the seal portion 36 were formed in resin layers by stamping of a plate material with a rectangular cross section. Of the three grooves which were provided in this manner, the middle groove functioned as a gas chamber 33b, and the grooves 33a and 33c on both sides had a urethane tube with a diameter of 6 mm embedded in a groove with a width of 5 mm and depth of 5 mm. The groove between them, i.e., the groove 33b at the middle was left empty.

Accordingly, when the upper half of the mold was closed, groove 33b became a gas chamber for maintaining air tightness, and it captured and stored gas from the gas discharge grooves 37. A pressure adjusting mechanism having an accumulator was provided with the pressure adjusting mechanism communicating with the gas chamber. The gas pressure within the chamber was controlled within the range of ±0.02 MPa to maintain the gas pressure within the chamber to 0.05 MPa. During a period in which a large amount of gas is generated at the initial stage of foam molding, the gas pressure within the gas chamber also increases, so the pressure was adjusted by a method such as releasing gas to the atmosphere at that time.

According to the present invention, even if a foaming gas flows in from the PL portion during foam molding through the groove 33a provided on the inner side of the seal portion, for example, the gas goes no further than the interior of the gas chamber. Thus, after the pressure difference between the gas chamber and the interior of the mold is minimized and the pressure is balanced, gas release from the PL portion is suppressed, and the formation of so-called hard portions is effectively suppressed. Of course, the formation of burrs can also be effectively suppressed, and the formation of burrs can be restricted to formation in the smallest portions of the gas discharge groove and the like.

In other words, the sealing properties of the upper and lower outer peripheral portions on the inner side of the gas chamber need not be particularly high. Rather, in some instances, a certain degree of gas release from the PL portion is permissible in the initial stage of the foaming reaction.

However, it is preferable to adequately maintain the sealing effect of the outermost groove 33c. If, for example, a urethane tube with a diameter of 6 mm is installed in the outermost groove 33c measuring 5 mm×5 mm, the circular cross section deforms into a square cross section and is held in place by its resilience. In such an arrangement, a sealing effect is obtained which is the same as that of a conventional O-ring. In this manner, by completely sealing the seal portion by the packing effect of a urethane tube provided in the outermost groove, the gas pressure in the gas chamber on the inner side thereof can be maintained, and as a result, the formation of burrs in the PL portion can be effectively prevented.

The invention claimed:

1. A foam molding apparatus comprising a mold body which can be opened and closed and which has an upper mold half including an upper peripheral portion and a lower mold halt including a lower peripheral portion which opposes the upper peripheral portion when the mold body is closed, first and second seal portions provided between the upper peripheral portion and the lower peripheral portion and forming a seal between an interior and exterior of the mold body when the mold body is closed, a gas storing groove formed between the first and second seal portions and at least partially surrounding the interior of the mold body when the mold body is closed, and a gas discharge groove communicating between the interior of the mold body and the gas storing groove.

2. A foam molding apparatus as claimed in claim 1 including a plurality of gas discharge grooves communicating between the interior of the mold body and the gas storing groove.

3. A foam molding apparatus as claimed in claim 1 wherein the gas storing groove completely surrounds the interior of the mold body when the mold body is closed.

4. A foam molding apparatus as claimed in claim 1 including a pressure adjusting mechanism which adjusts an interior pressure of the gas storing groove.

5. A foam molding apparatus as claimed in claim 4 wherein the pressure adjusting mechanism includes a pipe communicating with the gas storing groove and a pressure adjusting valve connected to the pipe.

6. A foam molding apparatus as claimed in claim 4 wherein the pressure adjusting mechanism includes an accumulator communicating with the gas storing groove.

7. A foam molding apparatus as claimed in claim 1 wherein at least one of the seal portions comprises a resin coating layer having a depression formed in a surface thereof and a sealing member disposed in the depression.

8. A foam molding apparatus as claimed in claim 1 wherein each seal portion comprises a resin coating layer having a depression formed in a surface thereof and a sealing member disposed in the depression.

9. A foam molding apparatus as claimed in claim 8 wherein the gas storing groove comprises a space having sides defined by the resin coating layer of each seal portion.

10. A foam molding apparatus as claimed in claim 4 wherein the pressure adjusting mechanism comprises a pressure regulator which is set to maintain the interior pressure of the gas storing groove at a value above atmospheric pressure during molding.

11. A foam molding apparatus as claimed in claim 1 wherein each seal portion comprises a resin member extending around the interior of the mold body in the form of a ring and formed of a different material from the peripheral portions of the mold halves.

12. A foam molding apparatus as claimed in claim 11 wherein each seal portion includes a urethane sealing member sealingly contacting one of the peripheral portions.

13. A foam molding apparatus as claimed in claim 8 wherein each resin coating layer comprises an epoxy resin layer projecting from a planar surface of one of the peripheral portions, and each sealing member comprises a resin ring forming a seal between the resin coating layer and a planar surface of the other peripheral portion when the mold body is closed.

14. A foam molding apparatus comprising a mold body which can be opened and closed and which has an upper mold half including an upper peripheral portion and a lower mold halt including a lower peripheral portion which opposes the upper peripheral portion when the mold body is closed, the peripheral portions surrounding the interior of the mold body when the mold body is closed, a first seal portion extending around the interior of the mold body and forming a seal between the upper peripheral portion and the lower peripheral portion when the mold body is closed, a second seal portion extending around the first seal portion and forming a seal between the upper peripheral portion and the lower peripheral portion when the mold body is closed, a gas storing groove formed between the first and second seal portions and at least partially surrounding the interior of the mold body when the mold body is closed, and a gas discharge groove passing through the first seal portion and communicating between the interior of the mold body and the gas storing groove, each of the seal portions comprising a resin layer formed separately from and projecting from a surface of one of the peripheral portions towards a surface of the other peripheral portion when the mold body is closed, the gas storing groove comprising a space having sides defined by sides of the two resin layers and a top and bottom defined by the surfaces of the opposing peripheral portions of the mold halves when the mold body is closed.

15. A foam molding apparatus as claimed in claim 14 wherein each resin layer has a depression formed in a surface thereof and a sealing member disposed in the depression and forming a seal between the resin layer and the surface of the other peripheral portion when the mold body is closed.

16. A foam molding apparatus as claimed in claim 15 wherein each resin layer comprises an epoxy resin and the sealing member comprises urethane.

17. foam molding apparatus as claimed in claim 14 wherein the surfaces of the opposing peripheral portions of the mold halves where the resin layers are formed are planar.

* * * * *